US012095159B2

(12) United States Patent
Shen et al.

(10) Patent No.: US 12,095,159 B2
(45) Date of Patent: Sep. 17, 2024

(54) ANTENNA SYSTEM AND ELECTRONIC APPARATUS

(71) Applicant: Huawei Technologies Co., Ltd., Shenzhen (CN)

(72) Inventors: Laiwei Shen, Shanghai (CN); Liang Xue, Shanghai (CN); Jiaqing You, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 394 days.

(21) Appl. No.: 17/420,609

(22) PCT Filed: Jan. 4, 2019

(86) PCT No.: PCT/CN2019/070437
§ 371 (c)(1),
(2) Date: Jul. 2, 2021

(87) PCT Pub. No.: WO2020/140275
PCT Pub. Date: Jul. 9, 2020

(65) Prior Publication Data
US 2022/0085513 A1 Mar. 17, 2022

(51) Int. Cl.
*H01Q 13/10* (2006.01)
*H01Q 1/24* (2006.01)
(Continued)

(52) U.S. Cl.
CPC ........... *H01Q 13/103* (2013.01); *H01Q 1/243* (2013.01); *H01Q 1/44* (2013.01); *H01Q 5/378* (2015.01); *H01Q 21/28* (2013.01)

(58) Field of Classification Search
CPC .......... H01Q 1/44; H01Q 1/243; H01Q 1/521; H01Q 5/328; H01Q 5/378; H01Q 13/16; H01Q 13/103; H01Q 9/42; H01Q 21/28
See application file for complete search history.

(56) References Cited

U.S. PATENT DOCUMENTS 10,644,382 B2 * 5/2020 Lee .................... H04M 1/0283
10,700,716 B2 * 6/2020 Tsai ...................... H01Q 5/328
(Continued)

FOREIGN PATENT DOCUMENTS

CN 105789884 A 7/2016
CN 105826652 A 8/2016
(Continued)

*Primary Examiner* — Tung X Le
(74) *Attorney, Agent, or Firm* — Conley Rose, P.C.

(57) ABSTRACT

An antenna system having a first antenna that includes a metal middle frame, a first metal frame, and a second metal frame. The middle frame is a ground of the first antenna. The first and second metal frames are side edges of the mobile terminal. A first gap is formed by the first, the second metal frames, and the middle frame. A first end of the first metal frame is connected to the middle frame by a first connection point, and a second end of the first metal frame is connected to a first end of the second metal frame. A first slit is located between a second end of the second metal frame and the middle frame. The first feed point on the first metal frame is connected to the middle frame. A length of the first metal frame is greater than a length of the second metal frame.

20 Claims, 9 Drawing Sheets

(51) Int. Cl.

| | |
|---|---|
| ***H01Q 1/44*** | (2006.01) |
| ***H01Q 5/378*** | (2015.01) |
| ***H01Q 21/28*** | (2006.01) |

(56) References Cited

U.S. PATENT DOCUMENTS

| | | | | |
|---|---|---|---|---|
| 10,886,614 | B2 * | 1/2021 | Lee | H01Q 9/30 |
| 2013/0257662 | A1 | 10/2013 | Eom et al. | |
| 2016/0064820 | A1 * | 3/2016 | Kim | H01Q 9/045<br>343/767 |
| 2018/0069295 | A1 | 3/2018 | Han et al. | |
| 2018/0152208 | A1 | 5/2018 | Tsai et al. | |
| 2018/0261907 | A1 | 9/2018 | Ha et al. | |
| 2018/0261921 | A1 * | 9/2018 | Ha | H01Q 1/243 |
| 2018/0331418 | A1 | 11/2018 | Kim et al. | |
| 2019/0229429 | A1 | 7/2019 | Wu | |
| 2020/0058983 | A1 * | 2/2020 | Chen | H01Q 1/243 |

FOREIGN PATENT DOCUMENTS

| | | | |
|---|---|---|---|
| CN | 106299678 | A | 1/2017 |
| CN | 107204523 | A | 9/2017 |
| CN | 107508035 | A | 12/2017 |
| CN | 107591613 | A | 1/2018 |
| CN | 108039571 | A | 5/2018 |
| CN | 108123729 | A | 6/2018 |
| CN | 108155471 | A | 6/2018 |
| CN | 108199132 | A | 6/2018 |
| CN | 108321501 | A | 7/2018 |
| CN | 108417966 | A | 8/2018 |
| CN | 108879073 | A | 11/2018 |
| CN | 208046595 | U | 11/2018 |
| CN | 109004351 | A | 12/2018 |
| EP | 1016157 | A1 | 7/2000 |
| KR | 20130110323 | A | 10/2013 |
| WO | 9905753 | A1 | 2/1999 |
| WO | 2017185860 | A1 | 11/2017 |
| WO | 2019001147 | A1 | 1/2019 |

* cited by examiner

ANTENNA SYSTEM AND ELECTRONIC APPARATUS

CROSS-REFERENCE TO RELATED APPLICATIONS

This application is a National Stage of International Patent Application No. PCT/CN2019/070437 filed on Jan. 4, 2019, which is hereby incorporated by reference in its entirety.

TECHNICAL FIELD

This application relates to the field of communications technologies, and in particular, to an antenna system and an electronic apparatus.

BACKGROUND

In recent years, a user requires a large-size screen. A screen-to-body ratio of a mobile terminal (for example, a mobile phone) becomes a key technical point. The screen-to-body ratio is a ratio of a size of a screen to a size of the entire mobile terminal. However, to ensure wireless performance of the mobile terminal, enough space needs to be reserved between the screen and an outer edge of the mobile terminal for design of an antenna. This part of space is referred to as antenna clearance space. The screen-to-body ratio is reduced due to existence of this part of space. In a conventional antenna design, a relatively high screen-to-body ratio is usually implemented at the expense of performance of the antenna. However, the performance of the antenna is preferably ensured at the expense of the screen-to-body ratio and beauty of the mobile terminal. In other words, the performance and the screen-to-body ratio of the antenna cannot be both ensured.

SUMMARY

This application provides an antenna system and an electronic apparatus, to not only improve a screen-to-body ratio of a mobile terminal but also improve performance of an antenna.

According to a first aspect, an embodiment of this application provides an antenna system. The antenna system includes a first antenna. The first antenna includes a metal middle frame, a first metal frame, a second metal frame, a first feed point, a first connection point, and a first slit. The metal middle frame is a ground of the first antenna. The first metal frame is located on a first side edge of a mobile terminal. The second metal frame is located on a second side edge of the mobile terminal. A first gap is formed by the first metal frame, the second metal frame, and the metal middle frame. A first end of the first metal frame is connected to the metal middle frame by the first connection point, and a second end of the first metal frame is connected to a first end of the second metal frame. The first slit is located between a second end of the second metal frame and the metal middle frame. The first feed point on the first metal frame is connected to the metal middle frame. A length of the first metal frame is greater than a length of the second metal frame. By fully utilizing side space of the mobile terminal, a requirement for bottom clearance space is reduced, and a screen-to-body ratio is improved. In addition, the first antenna may be used as an enhanced L antenna. In a beside-head-hand scenario, a frequency of the antenna may be extended, to improve a power gain of the antenna.

In a possible design, the first antenna further includes a second connection point. The second connection point is located on the first metal frame, and the second connection point is connected to the metal middle frame. Performance of the antenna when the mobile terminal is held by a left hand and performance of the antenna when the mobile terminal is held by a right hand may be balanced by the second connection point. In addition, a resonance frequency of the antenna may be adjusted.

In another possible design, the first connection point is located on one side of the first feed point, and the second connection point is located on the other side of the first feed point.

In another possible design, the first antenna further includes a first connection component. The second connection point is connected to the metal middle frame by the first connection component. The resonance frequency of the first antenna may be adjusted by the first connection component.

In another possible design, the first connection component may be an inductive element, a capacitive element, or a filtering structure including several capacitors and inductors.

In another possible design, a status of the second connection point includes one of a short-circuit state, an open-circuit state, and a half-short-half-open-circuit state.

In another possible design, the first connection component may be an inductor. Through the inductor, the resonance frequency of the antenna may be reduced, a radiation aperture of the antenna may be changed, and the performance of the antenna may be improved.

In another possible design, the antenna system further includes a second antenna. The second antenna may include a third metal frame, a second feed point, and a second slit. The third metal frame is located on a third side edge of the mobile terminal. A second gap is formed by the third metal frame and the metal middle frame. The second slit is located on the third metal frame. The second feed point is located on the third metal frame. The second feed point is connected to the metal middle frame. Through the second antenna, radiation efficiency of the antenna may be improved in a free space scenario. In addition, by fully utilizing side space of the mobile terminal, a requirement for bottom clearance space is reduced, and a screen-to-body ratio is improved.

In another possible design, the second antenna may be an inverted F antenna.

In another possible design, the second antenna may be disposed at a top location of the mobile terminal. Slits are respectively disposed near the top location and on two side edges: a right side edge and a left side edge of the mobile terminal. A feed point is located on a fourth metal frame, and is connected to the metal middle frame. The fourth metal frame is located on a fourth side edge of the mobile terminal. The fourth side edge may be a top edge of the mobile terminal. Through the second antenna, radiation efficiency of the antenna is improved in a free space scenario.

In another possible design, the second antenna may be disposed at a top location of the mobile terminal. Slits are respectively disposed at the top of the mobile terminal and near two sides: a right side and a left side. A feed point is located on a fourth metal frame, and is connected to the metal middle frame. The fourth metal frame is located on a fourth side edge of the mobile terminal. The fourth side edge may be a top edge of the mobile terminal. Through the second antenna, radiation efficiency of the antenna is improved in a free space scenario.

In another possible design, the antenna system may further include a control switch. The control switch is configured to control working statuses of the first antenna and the second antenna. The working statuses of the first antenna and the second antenna are switched by the control switch, so that the mobile terminal has relatively high radiation efficiency and performance of the antenna in the free space scenario or the beside-head-hand scenario.

In another possible design, the mobile terminal may first determine a communication scenario in which the mobile terminal is currently located, and then determine an open/closed status of the control switch according to the communication scenario in which the mobile terminal is currently located, to control the working statuses of the first antenna and the second antenna. In this way, multi-antenna intelligent switching is implemented, and radiation efficiency of the antenna and performance of the antenna are ensured.

In another possible design, when the mobile terminal is in the beside-head-hand scenario, the control switch is configured to switch the working status of the first antenna to an on state: or when the mobile terminal is in the free space scenario, the control switch is configured to switch the working status of the second antenna to an on state.

In another possible design, the first antenna further includes a third connection point. The third connection point is located on the first metal frame, and the third connection point is connected to the metal middle frame.

In another possible design, the first antenna further includes a second connection component. The third connection point may be connected to the metal middle frame by the second connection component. A connection status of the third connection point may be controlled by the second connection component.

In another possible design, when the mobile terminal is in the beside-head-hand scenario, the second connection component is configured to control the third connection point to be in an open-circuit state, to improve radiation efficiency and performance of the antenna in the beside-head-hand scenario. When the mobile terminal is in the free space scenario, the second connection component is configured to control the third connection point to be in a short-circuit state, to improve radiation efficiency and performance of the antenna in the free space scenario.

In another possible design, the first antenna further includes a third slit and a switch. The third slit is located on the first metal frame. The first metal frame includes an upper part of the first metal frame and a lower part of the first metal frame. One end of the switch is connected to the upper part of the first metal frame, and the other end of the switch is connected to the lower part of the first metal frame.

In another possible design, when the mobile terminal is in the beside-head-hand scenario, the switch is switched to a closed state, to improve radiation efficiency and performance of the antenna in the beside-head-hand scenario. When the mobile terminal is in the free space scenario, the switch is switched to an open state, to improve radiation efficiency and performance of the antenna in the free space scenario.

According to a second aspect, an embodiment of this application further provides an electronic apparatus, including the foregoing antenna system. A signal is received or sent by the antenna system.

BRIEF DESCRIPTION OF DRAWINGS

To describe the technical solutions in the embodiments of this application or in the background more clearly, the following describes the accompanying drawings required for describing the embodiments of this application or the background.

DESCRIPTION OF EMBODIMENTS

The following describes the embodiments of this application with reference to the accompanying drawings in the embodiments of this application.

It should be explained that a free space scenario is an application scenario in which a mobile terminal is placed in an open environment. For example, a vacuum environment is a most ideal free space scenario. A beside-head-hand scenario is an application scenario in which a mobile terminal is held in a hand by a user, and an earpiece of the mobile terminal is aligned with an ear.

Figure 1A:
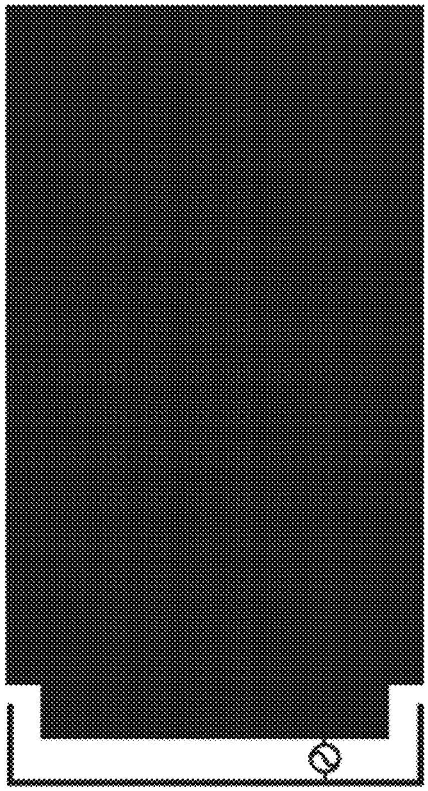
FIG. 1(A) a schematic structural diagram of an antenna.
Figure 1B:
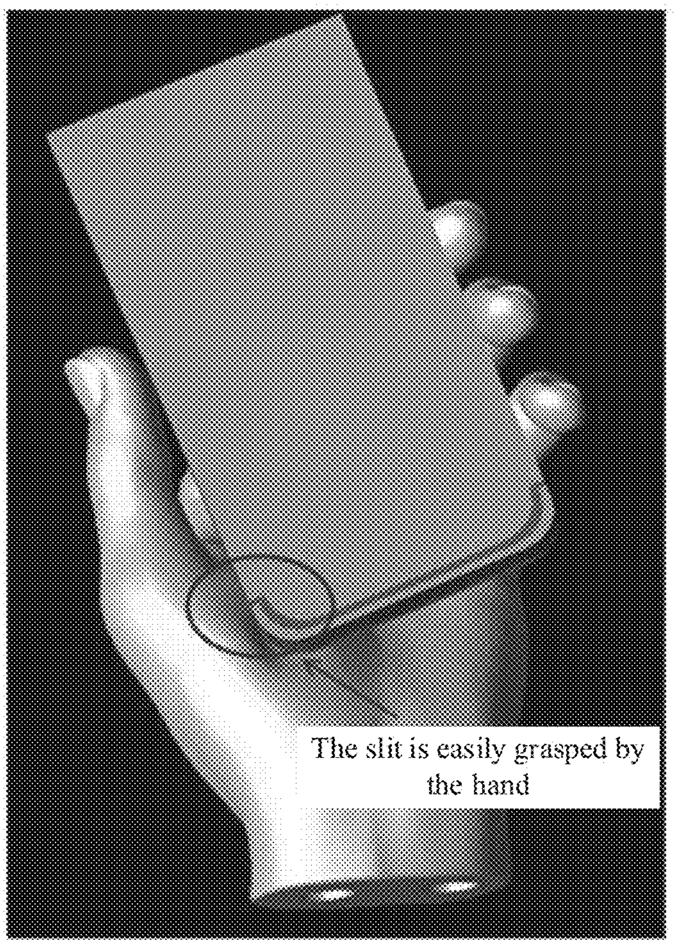
FIG. 1(B) is a schematic diagram of a hand holding status.

FIG. 1(A) a schematic structural diagram of an antenna. The antenna is disposed at a bottom of the mobile terminal. Slits are disposed on side edges of the mobile terminal and near the bottom location. In the free space scenario, radiation efficiency of the antenna is relatively high. FIG. 1(B) a schematic diagram of a hand holding status. Because locations of the slits of the antenna are relatively close to a palm location, when the user uses the mobile terminal, the slits are easily grasped or blocked, causing a sharp decrease in efficiency of the antenna. This phenomenon that a sharp decrease in a signal occurs because the slits are grasped or blocked is also referred to as "grasp of death". In addition, the antenna occupies relatively large bottom space of the mobile terminal. In this case, a distance between a lower edge of a screen display area and the bottom of the mobile terminal is increased, and a screen-to-body ratio of the mobile terminal is reduced.

Figure 2A:
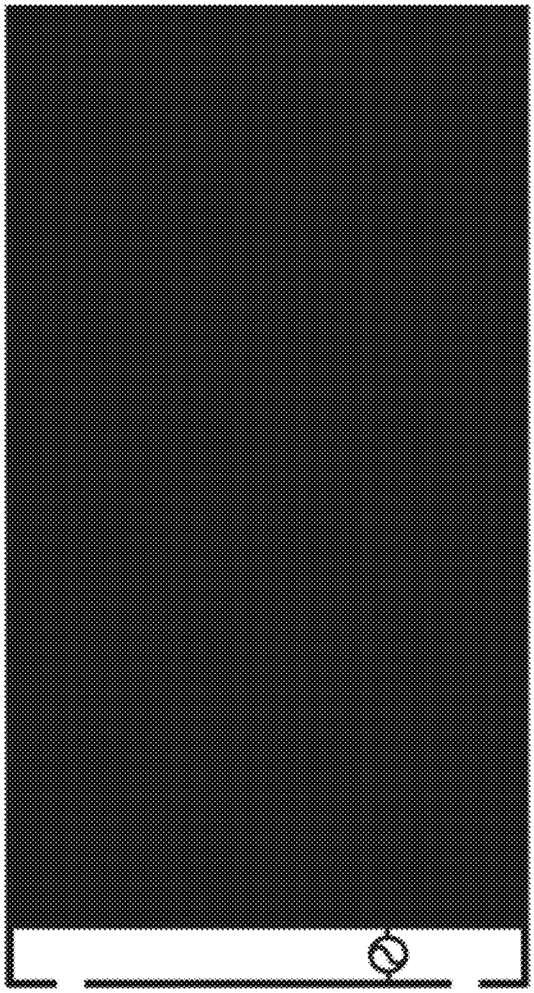
FIG. 2(A) a schematic structural diagram of another antenna.
Figure 2B:
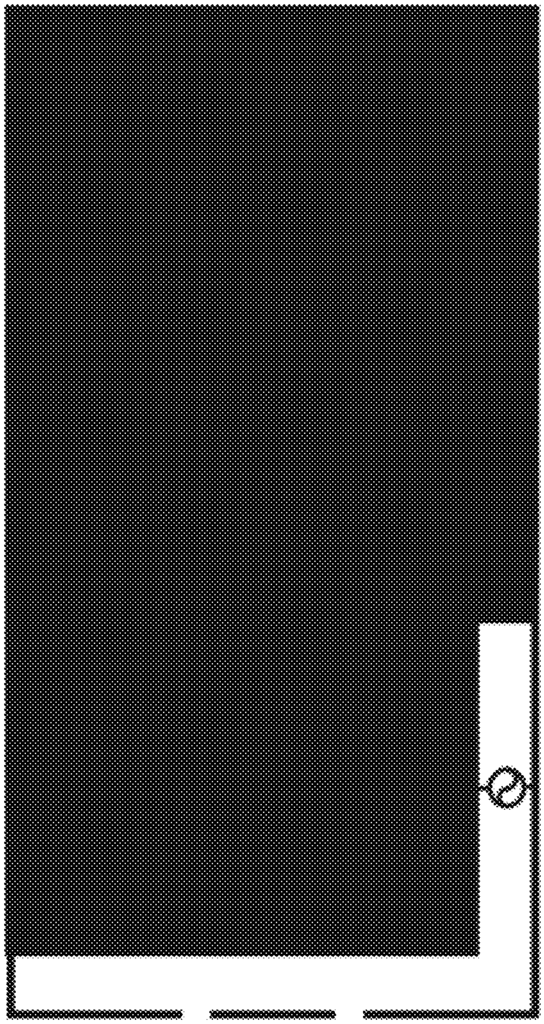
FIG. 2(B) a schematic structural diagram of still another antenna.

FIG. 2(A) a schematic structural diagram of another antenna. To avoid a sharp decrease in performance of an antenna m a hand holding status, slits of the antenna are disposed at locations that are at a bottom of a mobile terminal and that are near two sides. However, because the slits cause a smaller radiator, radiation efficiency of the antenna cannot reach optimal. Therefore, antenna clearance space needs to be increased to improve performance of the antenna. In this case, a screen-to-body ratio is reduced. In addition, because the slits of the antenna are still relatively distant from a palm location in the hand holding status. Performance of the antenna when the mobile terminal is held by a left hand is relatively greatly different from performance of the antenna when the mobile terminal is held by a right hand. Existence of "grasp of death" is also possible. FIG. 2(B) a schematic structural diagram of still another antenna. To improve radiation efficiency of the antenna in a beside-head-hand scenario, slits of the antenna are disposed at a bottom of a mobile terminal and near a middle location. However, in a free space scenario, the antenna has relatively low performance. In addition, to meet the European admission standard, the antennas shown in FIG. 2(A) and FIG. 2(B) need 1.5 mm antenna clearance space. This inevitably leads to a decrease in a screen-to-body ratio.

Figure 3:
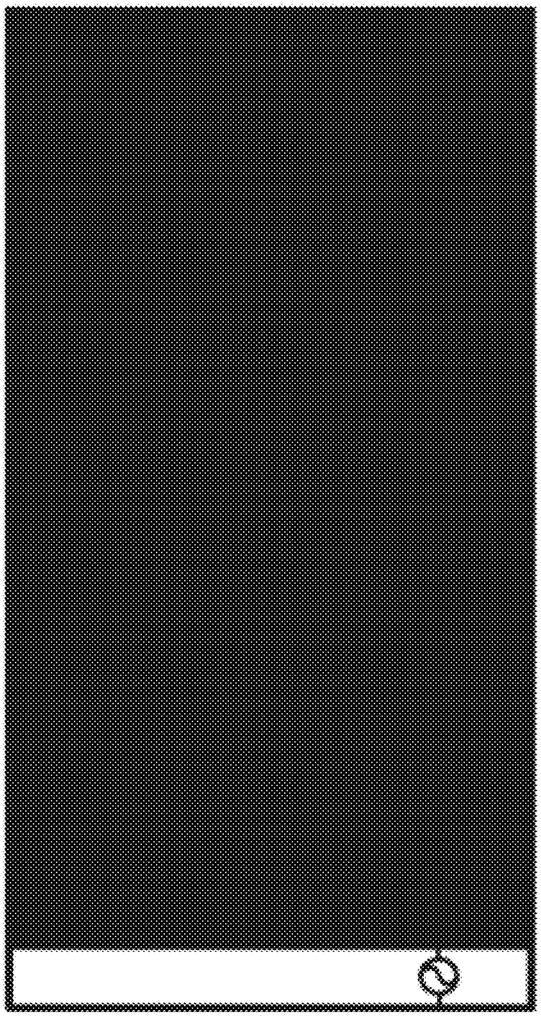
FIG. 3 a schematic structural diagram of still another antenna.

FIG. 3 is a schematic structural diagram of still another antenna. In this antenna, a slit is not disposed on a metal frame of a mobile terminal. This antenna is formed by only one closed metal slot. In a free space scenario, radiation efficiency of this antenna is relatively low. Therefore, this antenna is rarely used in the industry. In addition, because the antenna is placed at a bottom of the mobile terminal, in a beside-head-hand scenario, performance of this antenna is also poor.

In conclusion, hand holding statuses of the user for the mobile terminal vary with different application scenarios (a call, a game, music, and the like). For example, in a call scenario, some users tend to hold the mobile terminal with their left hands, and align the earpiece with their left ears. Some users tend to hold the mobile terminal with their right hands, and align the earpiece with their right ears. In addition, some users tend to hold the mobile terminal in their hands, and use a headset for communication. The radiation efficiency of the antenna is prone to interference from adjacent human tissues and external devices. In different call scenarios, a single antenna is highly susceptible to relatively large efficiency fluctuation due to frequency deviation or absorption, thereby affecting communication quality of the mobile terminal. For the foregoing several types of antennas, the performance of the antenna and the screen-to-body ratio cannot be both ensured in the beside-head-hand scenario and the free space scenario. To resolve the foregoing technical problem, the embodiments of this application provide the following solutions.

Figure 4:
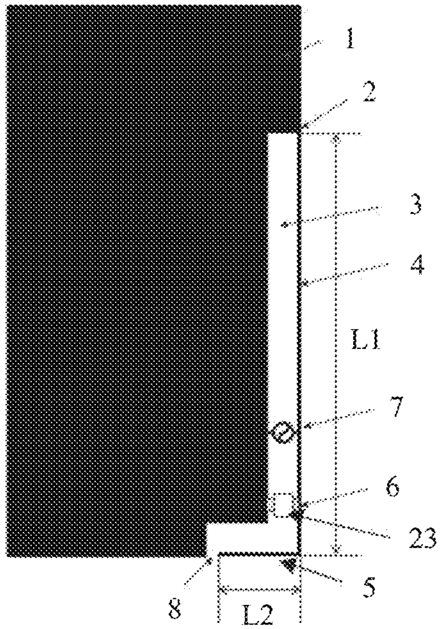
FIG. 4 is a schematic structural diagram of a first antenna according to an embodiment of this application.

FIG. 4 is a schematic structural diagram of a first antenna according to an embodiment of this application. The first antenna includes a metal middle frame 1, a first metal frame 4, a second metal frame 5, a first feed point 7, a first connection point 2, and a first slit 8. The first metal frame 4 is located on a first side edge of a mobile terminal. The second metal frame 5 is located on a second side edge of the mobile terminal. The first side edge may be a right side edge of the mobile terminal, and the second side edge is a bottom side edge of the mobile terminal. A first gap 3 is formed by the first metal frame 4, the second metal frame 5, and the metal middle frame 1. A first end of the first metal frame 4 is connected to the metal middle frame 1 by the first connection point 2, and a second end of the first metal frame 4 is connected to a first end of the second metal frame 5. The first slit 8 is located between a second end of the second metal frame 5 and the metal middle frame 1. The first feed point 7 on the first metal frame 4 is connected to the metal middle frame 1. In addition, a length L1 of the first metal frame 4 is greater than a length L2 of the second metal frame 5. For example, L1 is 1.2 times or more of L2. The metal middle frame 1 is a piece of metal in the middle of the mobile terminal, and may provide a support function. A small-area hole is allowed on the metal middle frame 1. The metal middle frame 1 may be used as a ground of the first antenna. The first metal frame 4 or the second metal frame 5 may be a part of a metal frame of the terminal that may be a hollow frame formed by thin strips.

Figure 5:
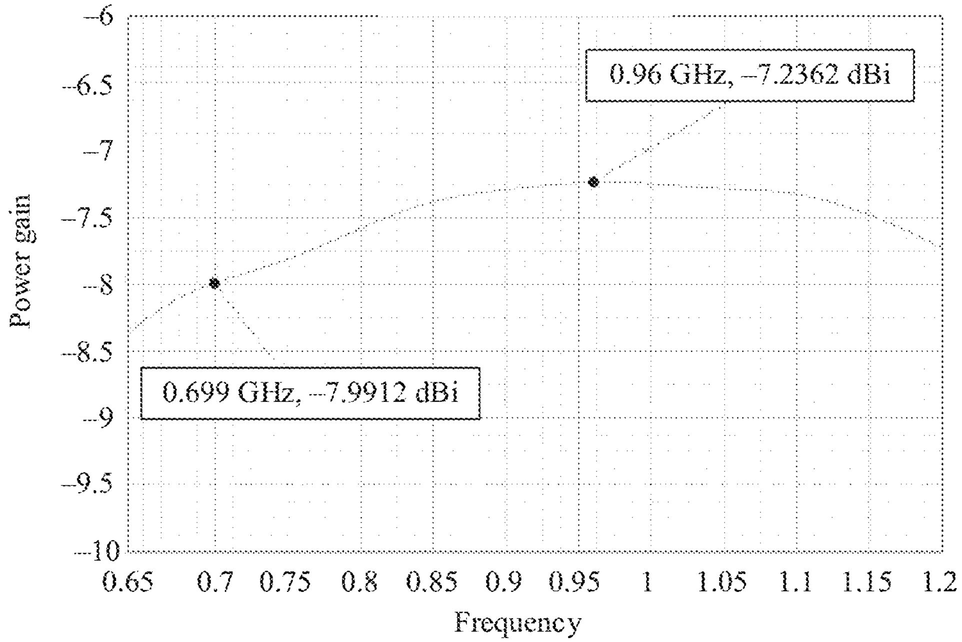
FIG. 5 is a schematic diagram of radiation efficiency according to an embodiment of this application.

In this embodiment of this application, the first antenna may be used as an enhanced L antenna. By fully utilizing side space of the mobile terminal, a requirement for bottom clearance space is reduced, and a screen-to-body ratio is improved. In addition, in a beside-head-hand scenario, Through the enhanced L antenna, a frequency of the antenna may be extended, to improve a power gain of the antenna. For example, FIG. 5 is a schematic diagram of a power gain according to an embodiment of this application. The enhanced L antenna may cover a frequency range from 0.699 GHz to 0.960 GHz. In this frequency range, the power gain continuously increases as the frequency increases. When a frequency of the enhanced L antenna is 0.699 GHz, a power gain may reach −7.9912 dBi. When a frequency of the enhanced L antenna is 0.96 GHz, the power gain may reach −7.2362 dBi.

Optionally, the first antenna further includes a second connection point 6. The second connection point 6 is located on the first metal frame 4, and the second connection point 6 is connected to the metal middle frame 1. The first connection point 2 is located on one side of the first feed point 7, and the second connection point 6 is located on the other side of the first feed point 7. For example, the first connection point 2 is located above the first feed point 7, and the second connection point 6 is located below the first feed point 7. In addition, the first connection point 2 is located at a top location of the first metal frame 4, and may be considered as a short-circuit point. The second connection point 6 may be located at a bottom location of the first metal frame 4. Through the second connection point 6, performance of the antenna when the mobile terminal is held by a left hand and performance of the antenna when the mobile terminal is held by a right hand may be balanced. In addition, a resonance frequency of the antenna may be adjusted.

Optionally, the first antenna further includes a first connection component or a first connection apparatus 23. The second connection point 6 may be connected to the metal middle frame 1 by the first connection component 23. The first connection component 23 may be an inductive element, a capacitive element, or a filtering structure including several capacitors and inductors. In this case, the second connection point 6 may be in a short-circuit state, an open-circuit state, or a half-short-half-open-circuit state, thereby further adjusting the resonance frequency of the first antenna. Herein. "short-circuit" indicates that an impedance of the first connection component 23 is less than a first preset value, "open-circuit" indicates that the impedance of the first connection component 23 is greater than a second preset value, and "half-short-half-open-circuit" may include other circuit statuses other than the short-circuit state and the open-circuit state. For example, the first connection component may be an inductor with a minimum value of 0 nH and a maximum value of 10 nH. Through the inductor, the resonance frequency of the antenna may be reduced, a radiation aperture of the antenna may be changed, and the performance of the antenna may be improved.

Figure 6:
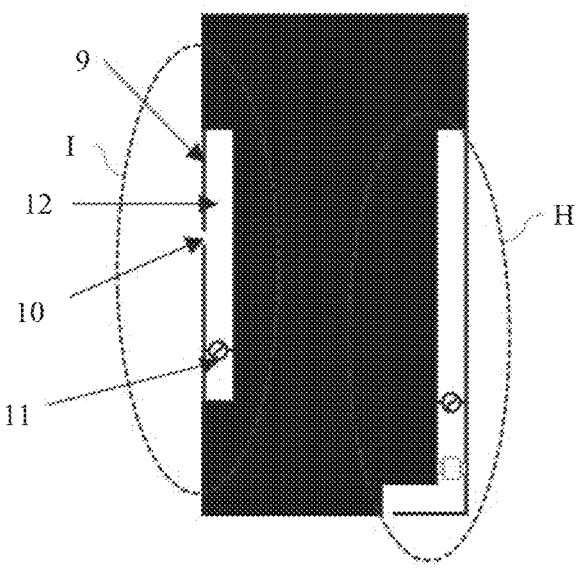
FIG. 6 is a schematic structural diagram of an antenna system according to an embodiment of this application.

FIG. 6 is a schematic structural diagram of an antenna system according to an embodiment of this application. The antenna system includes not only the first antenna H shown in FIG. 4, but also a second antenna I. The first antenna H is located on a first side edge of a mobile terminal. The first side edge may be a right side edge. The second antenna I is located on a third side edge of the mobile terminal. The third side edge may be a left side edge. The first antenna H is an enhanced L antenna. The second antenna I may include but is not limited to an IFA antenna (inverted F antenna).

The second antenna I may include a third metal frame 9, a second feed point 11, and a second slit 10. The third metal frame 9 is located on the third side edge of the mobile terminal. A second gap 12 is formed by the third metal frame 9 and a metal middle frame 1. The second slit 10 is located on the third metal frame 9. The third metal frame 9 includes an upper part of the third metal frame 9 and a lower part of the third metal frame 9. The second feed point 11 is located on the third metal frame 9, for example, the lower part of the third metal frame 9. The second feed point 11 is connected to the metal middle frame 1. The third side edge may be the left side edge of the mobile terminal. The upper part of the third metal frame 9 may be a parasitic branch, and the lower part of the third metal frame 9 may be a part of the IFA antenna. By fully utilizing side space of the mobile terminal, a requirement for bottom clearance space is reduced, a screen-to-body ratio is increased, and radiation efficiency of the antenna is improved in a free space scenario.

Figure 7:
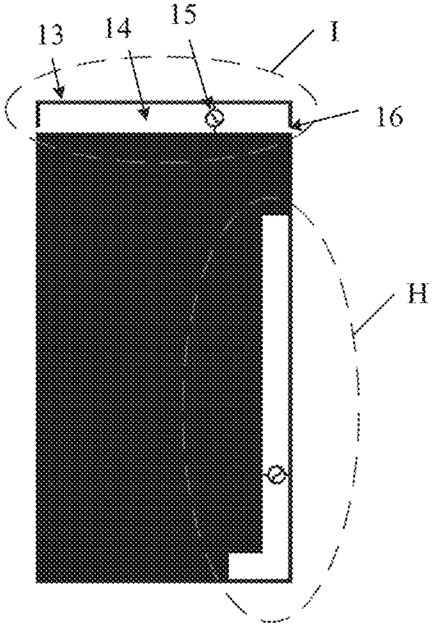
FIG. 7 is a schematic structural diagram of another antenna system according to an embodiment of this application.
Figure 8:
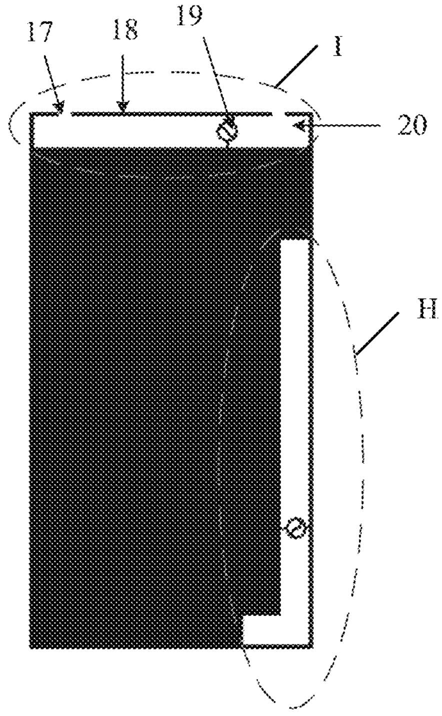
FIG. 8 is a schematic structural diagram of still another antenna system according to an embodiment of this application.

Optionally, FIG. 7 is a schematic structural diagram of another antenna system according to an embodiment of this application. A second antenna I in the antenna system may be disposed at a top location of a mobile terminal. Slits 16 are respectively disposed on two side edges: a right side edge and a left side edge of the mobile terminal and near the top location. A feed point 15 is located on a fourth metal frame 13, and the feed point 15 is connected to a metal middle frame 1. The fourth metal frame 13 is located on a fourth side edge of the mobile terminal. The fourth side edge may be a top edge of the mobile terminal. For another example, FIG. 8 is a schematic structural diagram of still another antenna system according to an embodiment of this application. A second antenna I in the antenna system may be disposed at a top location of a mobile terminal. Slits 17 are respectively disposed at locations that are on two sides: a right side and a left side and that are at the top of the mobile terminal. A feed point 19 is located on a fourth metal frame 18, and the feed point 19 is connected to a metal middle frame 1. The fourth metal frame 18 is located on a fourth side edge of the mobile terminal. The fourth side edge may be a top edge of the mobile terminal. In this embodiment of this application, the second antenna I may be located on a side edge of the mobile terminal, or may be located at the top of the mobile terminal, thereby improving radiation efficiency of the antenna in a free space scenario.

Figure 9:
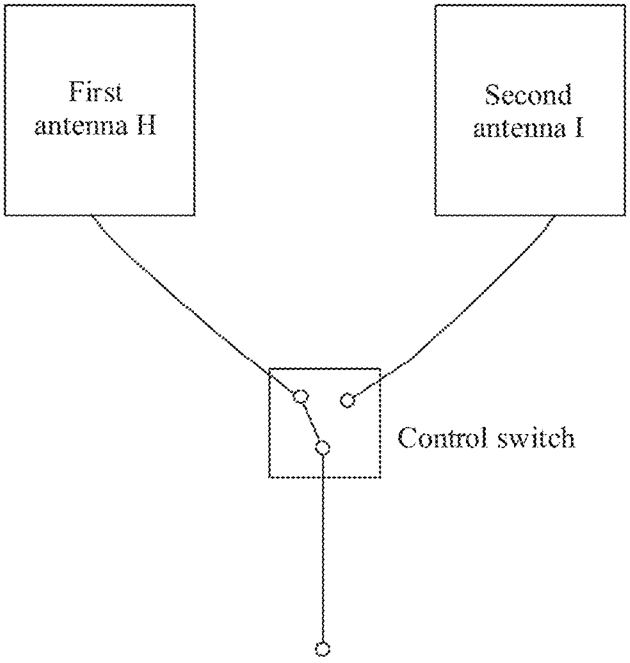
FIG. 9 is a schematic diagram of antenna switching according to an embodiment of this application.

Optionally, FIG. 9 is a schematic diagram of antenna switching according to an embodiment of this application. The foregoing antenna system may further include a control switch. The control switch may be a single-pole double-throw switch. A first end of the control switch is a radio frequency input port, a second end of the control switch may be connected to a first antenna H, and a third end of the control switch may be connected to a second antenna I. The control switch may be configured to control a working status of the first antenna H and a working status of the second antenna I. The working statuses of the first antenna H and the second antenna I are switched by the control switch, so that the mobile terminal has relatively high radiation efficiency of the antenna and performance of the antenna in a free space scenario or a beside-head-hand scenario. The following two optional implementations are included:

In an implementation, the control switch may be manually switched according to a communication scenario in which the mobile terminal is currently located. When the mobile terminal is in the beside-head-hand scenario, the first antenna H may be switched to an on state, and the second antenna I may be switched to an off state, so that radiation efficiency of the antenna is improved in the beside-head-hand scenario by the first antenna H. When the mobile terminal is in the free space scenario, the first antenna H may be switched to an off state, and the second antenna I may be switched to an on state, so that radiation efficiency of the antenna is improved in the free space scenario by the second antenna I.

In another implementation, the mobile terminal may first determine a communication scenario in which the mobile terminal is currently located, and then determine an open/closed status of the control switch according to the communication scenario in which the mobile terminal is currently located, to further control the working statuses of the first antenna and the second antenna. Further, when the mobile terminal is in a beside-head-hand scenario, the control switch is configured to switch the working status of the first antenna H to an on state. When the mobile terminal is in a free space scenario, the control switch is configured to switch the working status of the second antenna I to an on state. In this way, multi-antenna intelligent switching is implemented, and radiation efficiency of the antenna and performance of the antenna are ensured.

Figure 10:
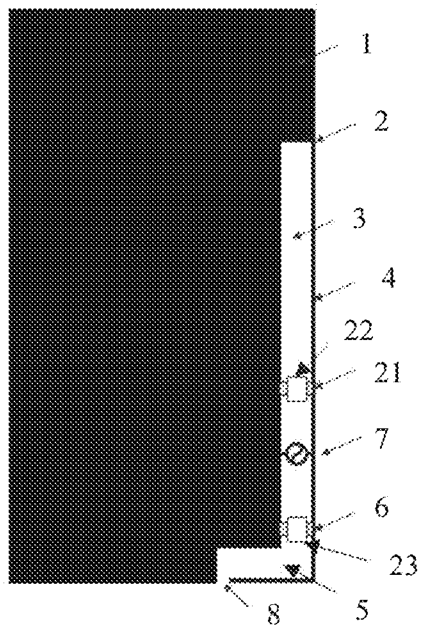
FIG. 10 is a schematic structural diagram of still another antenna system according to an embodiment of this application.

FIG. 10 is a schematic structural diagram of still another antenna system according to an embodiment of this application. A first antenna in the antenna system further includes a third connection point 21 and a second connection component 22. The third connection point 21 is located on a first metal frame 1. The third connection point 21 may be connected to a metal middle frame 1 by the second connection component 22. The second connection component 22 may be an adjustable switch. In addition, a second connection point 6 is located below a first feed point 7, and the third connection point 21 is located above the first feed point 7. When the mobile terminal is in a beside-head-hand scenario, the third connection point 21 on a first metal frame 4 is in an open-circuit state, and the second connection point 6 is connected to the metal middle frame 1 by an inductor 23. In this case, the metal middle frame 1, the first metal frame 4, a second metal frame 5, the second connection point 6, a first connection point 2, a first slit 8, and the first feed point 7 form an enhanced L antenna, to improve radiation efficiency and performance of the antenna in the beside-head-hand scenario. When the mobile terminal is in a free space scenario, the third connection point 21 is in a short-circuit state. In this case, the metal middle frame 1, the first metal frame 4, the third connection point 21, the first feed point 7, and the first connection point 2 form another antenna, thereby improving radiation efficiency and performance of the antenna in the free space scenario.

Figure 11:
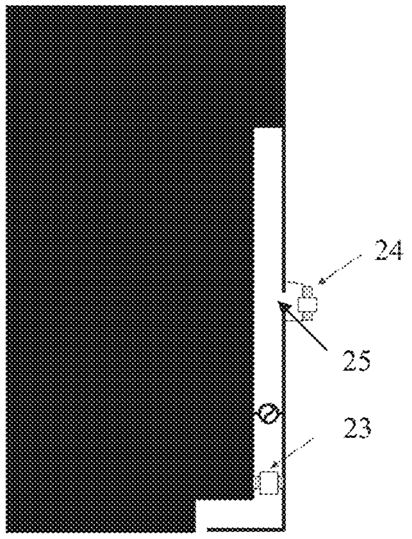
FIG. 11 is a schematic structural diagram of still another antenna system according to an embodiment of this application.

FIG. 11 is a schematic structural diagram of still another antenna system according to an embodiment of this application. A first antenna in the antenna system further includes a third slit 25 and a switch 24. The third slit 25 is located on a first metal frame 4. The first metal frame 4 includes an upper part of the first metal frame 4 and a lower part of the first metal frame 4. One end of the switch 24 is connected to the upper part of the first metal frame 4, and the other end of the switch 24 is connected to the lower part of the first metal frame 4. When a mobile terminal is in a beside-head-hand scenario, the switch 24 is switched to a closed state. In this case, the third slit 25 on the first metal frame 4 is in the closed state. Therefore, a metal middle frame 1, the first metal frame 4, a second metal frame 5, a second connection point 6, a first connection point 2, a first slit 8, and a first feed point 7 form an enhanced L antenna, to improve radiation efficiency and performance of the antenna in the beside-head-hand scenario. When the mobile terminal is in a free space scenario, the switch 24 is switched to an open state. In this case, the third slit 25 on the first metal frame 4 is in the open state, and the first antenna is in an open state, thereby improving radiation efficiency and performance of the antenna in the free space scenario.

An embodiment of this application further provides an electronic apparatus, including the foregoing antenna system. A signal is received or sent by the antenna system.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An antenna system, comprising:

a first antenna comprising:

a metal middle frame, wherein the metal middle frame is a ground of the first antenna;

a first connection point;

a first metal frame comprising an upper part and a lower part and disposed on a first side edge of a mobile terminal, wherein a first end of the first metal frame is coupled to the metal middle frame by the first connection point;

a second metal frame configured to dispose on a second side edge of the mobile terminal, wherein a first end of the second metal frame is coupled to a second end of the first metal frame, and wherein a length L2 of the second metal frame is less than a length L1 of the first metal frame;

a first feed point is located on the first metal frame;

a first slit located between the metal middle frame and a second end of the second metal frame;

a second slit located on the first metal frame and between the upper part and the lower part; and a switch, wherein a first end of the switch is coupled to the upper part, and wherein a second end of the switch is coupled to the lower part, wherein a first gap is formed by the first metal frame, the second metal frame, and the metal middle frame.

2. The antenna system of claim 1, wherein the first antenna further comprises a second connection point located on the first metal frame and coupled to the metal middle frame, wherein the first connection point is located on a first side of the first feed point, and wherein the second connection point is located on a second side of the first feed point.

3. The antenna system of claim 2, wherein the first antenna further comprises a first connection component, and wherein the second connection point is coupled to the metal middle frame by the first connection component.

4. The antenna system of claim 3, wherein the first connection component is an inductor with a minimum value of 0 nH and a maximum value of 10 nH.

5. The antenna system of claim 3, wherein a status of the second connection point comprises one of a short-circuit state, an open-circuit state, or a half-short-half-open-circuit state.

6. The antenna system of claim 3, wherein the first antenna further comprises a third connection point located on the first metal frame and coupled to the metal middle frame.

7. The antenna system of claim 6, wherein the first antenna further comprises a second connection component, and wherein the third connection point is coupled to the metal middle frame by the second connection component.

8. The antenna system of claim 7, wherein the second connection component is configured to:

control the third connection point to be in an open-circuit state when the mobile terminal is in a beside-head-hand scenario; or control the third connection point to be in a short-circuit state when the mobile terminal is in a free space scenario.

9. The mobile terminal of claim 2, wherein the antenna system further comprises a first connection component, wherein the second connection point is coupled to the metal middle frame by the first connection component.

10. The antenna system of claim 3, wherein the first connection component is a capacitor.

11. The antenna system of claim 3, wherein the first connection component is a filter.

12. The antenna system of claim 1, further comprising a second antenna, wherein the second antenna comprises:

a third metal frame located on a third side edge of the mobile terminal;

a second feed point located on the third metal frame and coupled to the metal middle frame; and a third slit located on the third metal frame, wherein a second gap is formed by the third metal frame and the metal middle frame.

13. The antenna system of claim 12, further comprising a control switch configured to control working statuses of the first antenna and the second antenna.

14. The antenna system of claim 13, wherein the control switch is configured to:

switch a working status of the first antenna to an on state when the mobile terminal is in a beside-head-hand scenario, or switch a working status of the second antenna to an on state when the mobile terminal is in a free space scenario.

15. The antenna system of claim 1, wherein the switch is configured to:

switch to a closed state when the mobile terminal is in a beside-head-hand scenario; or switch to an open state when the mobile terminal is in a free space scenario.

16. The antenna system of claim 1, wherein the length L1 of the first metal frame and the length L2 of the second metal frame satisfy: L1 is 1.2 times or more of L2.

17. A mobile terminal, comprising:

an antenna system comprising:

a metal middle frame, wherein the metal middle frame is a ground of an antenna;

a first connection point;

a first metal frame comprising an upper part and a lower part and disposed on a first side edge of the mobile terminal, wherein a first end of the first metal frame is coupled to the metal middle frame by the first connection point;

a second metal frame located on a second side edge of the mobile terminal, wherein a first end of the second metal frame is coupled to a second end of the first metal frame, and wherein a length L2 of the second metal frame is less than a length L1 of the first metal frame;

a first feed point is located on the first metal frame;

a first slit located between the metal middle frame and a second end of the second metal frame;

a second slit located on the first metal frame and between the upper part and the lower part; and a switch, wherein a first end of the switch is coupled to the upper part, and wherein a second end of the switch is coupled to the lower part, wherein a first gap is formed by the first metal frame, the second metal frame, and the metal middle frame.

18. The mobile terminal of claim 17, wherein the antenna system further comprises a second connection point located on the first metal frame and coupled to the metal middle frame.

19. The mobile terminal of claim 18, wherein the first connection point is located on a first side of the first feed point, and wherein the second connection point is located on a second side of the first feed point.

20. The mobile terminal of claim 17, wherein the length L1 of the first metal frame and the length L2 of the second metal frame satisfy: L1 is 1.2 times or more of L2.

* * * * *